March 6, 1945.   R. K. LEWIS   2,370,907
HANDLE FOR FLOOR TREATING MACHINES
Original Filed March 6, 1941
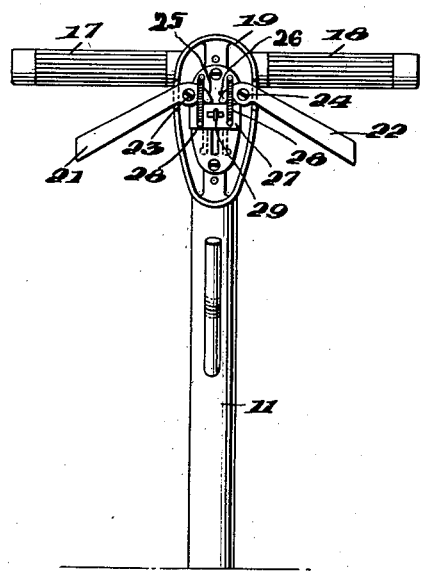
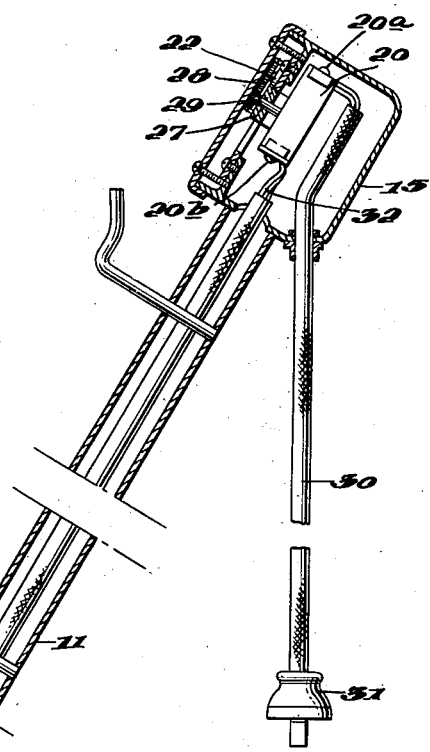
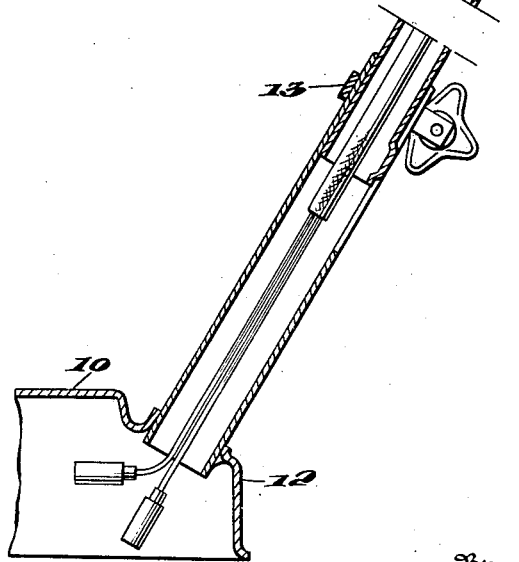
Inventor
RUSSELL K. LEWIS,
By Van Deventer & Grier
Attorney Patented Mar. 6, 1945

2,370,907

UNITED STATES PATENT OFFICE 2,370,907

HANDLE FOR FLOOR TREATING MACHINES

Russell K. Lewis, Elkhart, Ind., assignor to Finnell System, Inc., a corporation of Indiana Original application March 6, 1941, Serial No. 382,013. Divided and this application April 30, 1942, Serial No. 441,091

4 Claims. (Cl. 200—157)

This invention relates to improvements in handles for floor treating machines, such, for example, as that shown in co-pending application Serial No. 382,013 filed March 6, 1941, of which this is a divisional application.

The aforesaid co-pending application discloses a floor treating machine which may be used for scrubbing, sand-papering, waxing, polishing and the like, and such machine may comprise a motor, a gear reduction and a rotatable member driven through such gear reduction by said motor, said member carrying a brush, sand-paper or other device that directly contacts the floor for operation thereon. Such machines are pushed about over the floor by a handle, and an object of the present invention is to provide an improved form of handle which carries upon it a control for the electrical switch, controlling the circuit of the motor.

Another object of the invention is to provide a switching mechanism mounted upon a handle and operated by a pair of finger-grips so that the switching mechanism can be operated by either hand or from either side of the machine.

A further object is to provide a handle in which the connecting cord leading to the switch is carried in the casing of the handle.

In the accompanying drawing—

Figure 1 is a front view of a handle embodying the invention; and

Figure 2 is a sectional view of the handle shown in Figure 1.

The numeral 10 denotes the frame, casing, or other part of the machine with which the handle is used, and the handle 11 is secured therein in any suitable way, such, for example, by welding it into a socket on the casing shown at 12.

The handle may comprise a pair of telescopic tubes, as shown in Figure 2, a clamping ring 13, and a cam 14 being applied to the outer tube for clamping the tubes in any position so as to alter the length of the handle.

At the upper end of the tube 11 is welded a casing 15 and extending laterally therefrom is a tubular member 16 carrying a pair of rubber hand grips 17, 18. The casing 15 is provided with a detachable front cover 19 and encloses a suitable switching mechanism 20, which is held in the casing as a unit by screws 20ª, 20ᵇ.

This switching mechanism is operated by a pair of finger grips 21, 22, which are pivoted on lugs in the casing, as shown at 23, 24, and which have cam noses 25, 26, adapted to engage the sliding block 27 which is normally held in the upward position, Figure 2, by means of tension springs 28. By squeezing the handles 21, 22, toward the hand grips 17, 18, the block 27 will be moved downward and the electrical circuit to the motor of the machine closed via the switch 20, the movable switch actuator member 29 of which is connected to the sliding block 27. Therefore, the device may be operated by either hand or from either side of the machine, and the switch will remain closed only as long as one of the handles 21, 22, are held upwards.

The usual connecting cord 30 is provided having the attachment plug 31 on its outer end. This connects to the terminals of switch 20, which may be either a single or double pole, and the conductors 32 continue down from the switch through the tube 11, terminating at their lower end in suitable connectors 33 in the base within the casing 10, which connectors connect to suitable terminals or other connectors located within the base or housing circuit with the motor thereof.

To use the handle, the machine operator may grasp the hand grips 17, 18, and push the machine over the floor without the motor being in operation, the finger grips 21, 22, being released so that the switching mechanism 20 is in open circuit position.

When it is desired to start the motor, the operator merely extends his fingers to embrace one or the other of the finger grips 21, 22, drawing either of them toward its associated hand grips 17, 18. This immediately operates the switch 20 in the manner previously described, starting the motor of the machine.

It will be seen from the foregoing that the operator's hand is in an easy and natural position when keeping the grips closed against the adjacent handles as his hands are on the handle in order to move the machine about when in use, while at the same time if for any reason the operator lets go of the handles the motor stops, which is quite important in the event that the machine should accidentally tip over or the operator should slip and fall. In such cases where the switch is manually operated by a special movement, the machine continues running, although the operator's hands are not upon it; whereas with the improved handle forming the subject-matter of this application, the motor will stop as soon as the operator's hand leaves the handle.

What is claimed is:

1. In combination, a handle, a casing supported at one end thereof, a pair of rigid hand grip members secured to said handle, a switching mechanism mounted in said casing including a movable member, spring means within said casing tending to move said movable member to normal open circuit position, actuating means for said movable member mounted in said casing and projecting laterally therefrom including a pair of finger grips underlying said hand grip members, and means mounted in said casing adapted to be actuated by said finger grips to move said movable member of said switching mechanism to closed circuit position against the tension of said spring.

2. In combination, a handle member, a casing supported at one end thereof, a pair of rigid hand grip members secured to said handle, a switch including a movable member mounted in said casing, a finger grip extending laterally from said casing and underlying said hand grip members pivotally mounted therein, said grip having a cam nose member formed at its inner end, and a spring-restrained member mounted in said casing and engaged by said grip cam member adapted to actuate the movable member of said switch to move same from normal open circuit position to closed circuit position when said finger grip is engaged by the operator.

3. In combination, a handle member, a casing supported at one end thereof and having side walls, a pair of hand grip members secured to said handle, a finger grip underlying one of said hand grip members and extending laterally from said casing and movably mounted thereon, said grip having switch-engaging means at its inner end within said casing, a switch mechanism within said casing mounted as a removable unit therein, means for moving said switch from open to closed circuit position by the movement of said finger grip toward said handle including a camming portion on said finger grip, and means in said casing tending to normally hold said switch in open circuit position except when actuated as aforesaid.

4. In combination, a handle having a casing at its outer end, hand grip members secured to said handle, a switching mechanism supported in said casing and removable therefrom as a unit, finger grips underlying said hand grip members and extending laterally from said first casing and pivoted thereon, spring means for positioning said grips in relation to their support, and means including a member interposed between said grips and the movable member of said switch, whereby upon movement of either of said grips, said switching mechanism may be moved from open to closed circuit position thereby and against the tension of said spring.

RUSSELL K. LEWIS.